United States Patent [19]

Sherno

[11] 4,413,026

[45] Nov. 1, 1983

[54] METHOD FOR WEATHERPROOFING SUBSTRATES

[75] Inventor: Stanley A. Sherno, Columbia, S.C.

[73] Assignee: Aperm of South Carolina, Greenwood, S.C.

[21] Appl. No.: 395,956

[22] Filed: Jul. 7, 1982

Related U.S. Application Data

[60] Continuation of Ser. No. 279,062, Jun. 30, 1981, abandoned, which is a division of Ser. No. 129,249, Mar. 11, 1980, abandoned, which is a continuation-in-part of Ser. No. 103,438, Dec. 14, 1979, abandoned, which is a continuation-in-part of Ser. No. 41,592, May 23, 1979, abandoned.

[51] Int. Cl.$^3$ ............................................. B05D 3/02
[52] U.S. Cl. .............................. 427/407.1; 427/385.5
[58] Field of Search ......................... 521/53–57, 521/69, 139; 427/186, 243, 385.5, 407.1; 428/71–73, 141–144, 147; 106/2

[56] References Cited

U.S. PATENT DOCUMENTS

| | | | |
|---|---|---|---|
| 3,251,916 | 5/1966 | Newnham et al. | 264/128 |
| 4,122,203 | 10/1978 | Stahl | 156/71 X |
| 4,173,675 | 11/1979 | Vallon et al. | 427/186 X |

*Primary Examiner*—Thurman K. Page
*Attorney, Agent, or Firm*—Larson and Taylor

[57] ABSTRACT

A coating composition. The composition includes particles of polystyrene foam in admixture with a latex resin binder. The admixture can be sprayed or otherwise coated on a roof or other surface and provides a durable, insulating and inexpensive substitute for other coating materials. The amount of latex binder, which is relatively expensive, is preferably kept to a minimum and the polystyrene foam particles may be derived from waste or low-cost foam polystyrene.

13 Claims, No Drawings

METHOD FOR WEATHERPROOFING SUBSTRATES

This is a continuation, of the application Ser. No. 279,062 filed June 30, 1981 which was a division of application Ser. No. 129,249 filed Mar. 11, 1980 which was a continuation-in-part of application Ser. No. 103,438 filed Dec. 14, 1979 which was a continuation-in-part of application Ser. No. 041,592 filed May 23, 1979, all now abandoned.

BACKGROUND OF THE INVENTION

This invention relates to compositions for coating surfaces such as roofs and the like.

The most widely used roof coating compositions are based on asphalt. While these materials are useful, they have several disadvantages. For example, the material tends to dry out and crack and requires a good deal of maintenance. In addition, asphalt materials are poor heat insulators and do not reflect heat. It has been proposed in the past to provide various other materials as substitutes for asphalt. These proposed substitutes, however, have not been adopted because of disadvantages which outweigh the disadvantages of conventional asphalt materials. Among the main disadvantages of the proposed substitute materials are increased cost of materials and/or application, lack of durability, dangerous chemcials, hazardous application methods, and the like.

It is an object of the present invention to provide an improved coating composition. It is a further object of the present invention to provide a new coating composition which is a feasible substitute for asphalt compositions conventionally applied as a roof coating composition and to provide a method of coating roofs therewith. It is a further object to provide such coating compositions which are inexpensive, easily applied, and which to not involve the use of hazardous chemicals. It is yet a further object of the invention to provide such coating compositions which provide other advantages over asphalt coating compositions such as improved heat insulation properties and improved heat reflective properties.

The foregoing and other objects which will be apparent to those of ordinary skill in the art are achieved in accordance with the present invention by providing a coating composition comprising about 40 to 80 percent by volume of particles of polystyrene foam plastic particles, in admixture with about, correspondingly, 60 to 20 percent by volume of an aqueous synthetic resin latex (the percentages being based on the total amount of polystyrene and aqueous latex). The aqueous synthetic resin latex emulsion can be any such resin latex capable of forming a film. Suitable latices include those used in latex paints and these are preferred because of their ready availability. Common latices of this type contain acrylic resins, polyvinyl acetate resins, and butadiene-styrene resins. The solids content of the resin latex can vary considerably and is generally about 25–27 percent by weight and typically about 35 percent by weight. The balance of the resin latex is made up of water and conventional addenda such as stabilizers and the like.

Suitable aqueous synthetic resin latices are those made by emulsion polymerization and commonly used in paints, particularly exterior paints. As disclosed in U.S. Pat. No. 3,356,627, important polymers include polymers and copolymers of: (1) vinyl esters of an aliphatic acid having 1 to 18 carbon atoms, especially vinyl acetate; (2) acrylic acid esters and methacrylic acid esters of an alcohol having 1 to 18 carbon atoms, especially methyl acrylate, ethyl acrylate, butyl acrylate, 2-ethylhexyl acrylate, methyl methacrylate, ethyl methacrylate and butyl methacrylate; and (3) mono- and di-ethylenically unsaturated hydrocarbons, such as ethylene, isobutylene, styrene, and aliphatic dienes, such as butadiene, isoprene, and chloroprene.

Poly(vinyl acetate) and copolymers of vinyl acetate with one or more of the following monomers: vinyl chloride, vinylidene chloride, styrene, vinyltoluene, acrylonitrile, methacrylonitrile, one or two of the acrylic and methacrylic acid esters mentioned above are well-known as the film-forming component of aqueous base paints. Similarly copolymers of one or more of the acrylic or methacrylic acid esters mentioned above with one or more of the following monomers: vinyl acetate, vinyl chloride, vinylidene chloride, styrene, vinyltoluene, acrylonitrile, and methacrylonitrile are also more or less conventionally employed in aqueous base paints. Homopolymers of ethylene, isobutylene, and styrene, and copolymers of one or more of these hydrocarbons with one or more esters, nitriles or amides of acrylic acid or of methacrylic acid or with vinylidene chloride are also used. The diene polymers are generally used in aqueous base paints in the form of copolymers with one or more monomers following: styrene, vinyltoluene, acrylonitrile, methacrylonitrile, and the abovementioned esters of acrylic acid or methacrylic acid. It is also quite common to include a small amount, such as $\frac{1}{2}$ to 2.5% or more, of an acid monomer in the monomer mixture used for making the copolymers of all three general types mentioned above by emulsion polymerization. Acids used include acrylic, methacrylic, itaconic, aconitic, citraconic, crotonic, maleic, fumaric, the dimer of methacrylic acid, and so on. Additional suitable latices are disclosed in the following U.S. Pat. Nos. 3,356,627; 3,320,198; 2,965,590; 2,904,523; 2,888,422; 3,008,847; 3,104,234; 3,037,881 the disclosures of which are herein incorporated by reference. Suitable commercially available acrylic resins include those denoted as Rhoplex (e.g. AC33, LC67, AC636, AC64, LC45, and AC634).

In accordance with the invention, polystyrene foam beads are blended with the latex emulsion and the admixture is coated onto a roof or other surface in a desirable thickness. The water present in the emulsion, as well as any added water, fibres by evaporation leaving a tenacious, lightweight, water proof and heat insulating coating made up of the foam polystyrene particles bound together by the synthetic resin. Generally, the amount of latex resin solids in the coating composition and in the final coating is about 2 to 60 parts by volume per 100 parts by volume of foam polystyrene particles. Where cost is a major factor, the amount of resin solids is preferably as low as possible and preferably in the range of 2 to 20 parts, same basis. For some applications, a high resin solids content of over 20 parts, up to as much as about 60 parts (same basis) is desirable. In these instances, and in others in others in which cost is not of major importance, the amount of resin solids can be in the range of from over 20 up to 60 parts by volume per 100 parts by volume of foam polystyrene particles.

The polystyrene foam particles preferably have a particle size of about 0.03 to 0.3 inches. The particles are made of conventional polystyrene foam such as expanded polystyrene resin having a specific gravity of about 0.02 to 0.1 and a molecular weight of about 100,000 to 1,000,000. Preferably, the particles are made by grinding larger pieces of polystyrene foam, preferably waste foam material. However, the foam particles may also be made in the form of multicellular beads of polystyrene foam having the particle size mentioned above. The foam particles are each a particle of plastic foam as opposed to a hollow sphere. In other words, the foam plastic particles are multicellular and not monocellular. The term "foam" as used in the present specification and claims is used in this sense.

As mentioned above, the composition may include other addenda such as emulsifiers, stabilizers, fillers, pigments, plasticizers, dispersing agents, insecticides, pH adjusting agents, surfactants, thickeners, anti-freeze, and the like. However, the composition is preferably asphalt-free and where pigments and fillers are employed, they are preferably first blended in an aqueous system which is subsequently blended with the aqueous resin latex. The following example illustrates a preferred formulation and blending technique.

EXAMPLE I

The following ingredients are blended for 15 minutes:

|  | Wt. in grams |
| --- | --- |
| Thickening agent (Hydroxyethylcellulose 3% by weight in water) | 145.5 |
| Water | 20 |
| Latex dispersing agent (Tamol 850 sodium salt of condensed aryl sulfonic acid) | 5 |
| Pigment dispersing agent (Potassium tri-polyphosphate) | 1.5 |
| Anti-freeze (ethylene glycol) | 26 |
| Defoamer (Nopco NXZ) | 2 |
| Pigment (TiO$_2$ R-960 grade) | 74 |
| Filler (ground limestone) | 430 |
| Carrier for insecticide (Zinc oxide) | 50 |

After the foregoing ingredients are homogeneously blended, the following ingredients are added and blending is continued for an additional thirty minutes:

| Aqueous resin latex (Acrylic, 50% solids) | 430 |
| --- | --- |
| Insecticide (2-N—octyl-4-isothiazolin-3-one in propylene glycol) | 2.2 |
| pH adjustment (NH$_4$OH, 28% NH$_3$) | 1.0 |
| Plasticizer (2,2,4-trimethyl-1,3-pentanediol monoisobutyrate) | 7.8 |
| Defoamer (Nopco NXZ) | 2 |
| Water | 31 |

Foamed polystyrene beads having a particle size of About 1/10 inch are then blended into the aqueous blend in an amount of 35% by volume wet blend, 65% foam polystyrene beads. The weight of the final blend is about 12 pounds per gallon. The final blend is coated on a roof at a thickness of 250 mils (0.250 inches). After a period of time, the water evaporates, leaving a tenaciously adherent, weather resistant, waterproof, lightweight, heat insulating and inexpensive roofing material which provides a feasible substitute for asphalt-based roofing material. Shrinkage due to evaporating is negligible, usually much less than 10 percent, because of the small volumetric content of water in the final blend.

EXAMPLE II

Example I is followed except that the latex contains 35 percent resin solids and is used in an amount equal in volume to that of the foam polystyrene particles. The amount of the latex resin solids in the final coating is about 32 parts by volume per 100 parts by volume of polystyrene particles. An excellent, water proof and heat insulating coating is provided.

EXAMPLE III

Example I is followed except that the latex is Rhoplex AC 33, a 40% solids content acrylate emulsion available from Rohm and Haas Co., Philadelphia, Pa., and described in Example I of U.S. Pat. No. 2,795,564. An excellent waterproof and heat insulating coating is obtained.

EXAMPLE IV

Example I is followed except that the latex is an acrylic interpolymer latex as described in U.S. Pat. No. 3,320,198 in which the copolymer is made by copolymerixing 380 parts by weight of methyl methacrylate, 308 parts by weight of 2-ethylhexyl acrylate, and 9 parts by weight of methacrylic acid. An excellent waterproof and heat insulating coating is obtained.

The nature of the aqueous synthetic resin latex can vary considerably. Conventional acrylic latex and vinyl latex resins are preferred because of their ready availability, relative low cost, and because of the outstanding properties of the resulting coatings provided by the invention. However, other film-forming aqueous synthetic resin latices may be used.

The resin latex is the more expensive component of the coating, on a volume basis, and, where cost is of major importance, it is therefore desirable to use a minimum amount of resin. However, it is required that the coating be waterproof and a certain quantity of resin is needed for that purpose. While the minimum amount needed will vary somewhat on the nature and amount of various other ingredients in the composition (for example the particle size of the foamed polystyrene particles-more resin being required where a smaller particle size is used) in general the minimum amount needed will be about 2 parts by volume resin solids per 100 parts by volume of the foamed polystyrene particles. The maximum amount of resin is dependent upon practical factors, such as cost, and preferably does not exceed 60 parts by volume, same basis. In order to reduce costs, particularly where relatively thick coatings are provided, the coating may be provided in two layers: a first layer with a small amount of binder, for example 1-10 parts by volume of resin solids per 100 parts of foamed polystyrene particles; and a second layer with a greater amount of binder, for example 10-20 parts by volume, same basis.

It is preferred to employ a thickening agent, such as a starch, gel, or gum, which will thicken the aqueous system to a paint-like consistency, preferably thixotropic. Conventional thickeners such as hydroxyethyl cellulose, are suitable and are used in a conventional amount, depending primarily on the amount of water present, to achieve a suitable viscosity. Where the surface to be coated is flat, a lower viscosity is acceptable and the thickening agent may be eliminated from the composition. In general, however, and in particular where the surface to be coated is inclined to the horizontal, it is preferred to employ a thickening agent.

A surfactant or dispersing agent (e.g. Tamol 850, a sodium salt of a carboxylated polyelectrolyte) may be employed to assist in dispersing the latex resin in the final blend. A host of dispersing agents are readily available commercially and particularly efficacious dispersing agents are usually recommended by the manufacturers of the aqueous synthetic resin latex. These materials are widely used in latex paint formulations and are useful in the present invention to keep the latex resin well dispersed in the final blend. The dispersing agent, while not essential, is preferred to assist in dispersing the latex. The amount of dispersing agent will generally depend upon the amount of latex used and will generally be in substantially the same amount as is used in latex paint formulations.

The blend preferably includes a pigment, such as titanium dioxide power, and it is a feature of the invention that various colors can be imparted to the coating in much the same way the latex paint formulations may be pigmented. The nature and amount of the pigments used can vary widely and the materials and quantities used may be generally the same as in conventional latex paint formulations. Conventional fillers, such as calcium carbonate may also be employed as in conventional latex paint formulations. Conventional dispersing agents may also be employed to facilitate dispersion of the pigment and/or filler. For example, potassium tripolyphosphate may be used as a dispersing agent for $TiO_2$ pigment.

Anti-freeze is another optional ingredient. Ethylene glycol is preferred since it also exerts a plasticizing effect on the resin employed in the coating. The amount of anti-freeze, if utilized, is dependent upon the amount of the free water present and is preferably present in an amount sufficient to prevent freezing of the final blend at ambient temperature. In the case of ethylene glycol, an amount of from 5 to 50% by weight of the free water present is sufficient.

Conventional defoamers, such as Nopco NXZ, are preferably employed since foam in the final blend is not desirable. Defoaming agents suitable for latex paint formulations are widely known and may be employed in amounts normally used in such paints. Various biocidal agents may be added to the formulation to prevent attack by fungus, insects, and the like. For example, the insecticide 2-N-octyl-4-isothiazolin-3-one may be incorporated in an effective amount. A carrier for the insecticide, such as zinc oxide, may be added to the blend to serve as a support for the biocidal agent in the coating.

The pH of the final blend should be such as to prevent coagulation of the latex resin. Ammonia or other pH adjusting agents may be added for this purpose as is conventionally done in the formulation of latex paints.

Various conventional plasticizers for the resin may also be added. Plasticizers conventionally used in latex resin paint formulations may be employed in their conventional amount. Particular commercially available plasticizers are known to be particularly efficacious for particular commercially available latex resins in the latex paint field and such plasticizers are useful in the present invention.

Water is added, if needed, for purposes of blending the various ingredients such as pigments, fillers, and other solid materials, if present. Water is, of course, also present in the aqueous resin latex and may be present in other ingredients (such as a 3% aqueous solution of thickening agent).

The coating formulation is made up by blending the foamed polystyrene particles with the aqueous synthetic resin latex in any convenient blending device such as a paddle mixer. The various optional ingredients are preferably blended with the aqueous latex prior to blending with the polystyrene particles. Where a pigment is employed, it is preferably separately blended in an aqueous vehicle which would preferably include a pigment dispersing agent. Fillers, such as calcium carbonate, and other solid materials, are also preferably blended into the aqueous pigment system prior to blending with the aqueous resin latex. Blending of the pigment and other solid components is preferably accomplished in equipment conventionally employed in formulation of paint in which the pigment or other solid particles are ground to an appropriate size for dispersion in the aqueous vehicle.

The final coating composition is applied to a roof or other surface in a suitable thickness of, generally, about 30 mils to one inch. Preferably, the thickness for a roof is about 200 to 300 mils. The dried thickness of the coating is substantially the same because of the small volumetric content of water. As mentioned above, where thicker coatings are desired, two coating formulations may be applied in two layers. The bottom layer, which can be of any desired thickness, generally up to about one inch, has a low content of latex resin. The top layer, having a thickness of 100 to 300 mils, has higher content of the resin.

Another useful latex emulsion is sold under the Trademark Rhoplex LC67 and is available from Rohm and Haas. It is a thermoplastic acrylic emulsion containing 65% solids. It is described in the manufacturer's brochure RC-A-20 dated February, 1976.

What is claimed is:

1. A method of providing a weatherproof coating on an exterior surface which comprises providing an aqueous coating composition comprising an aqueous thermoplastic synthetic resin latex prepared by emulsion polymerization and capable of forming a film, and dispersed therewith, a plurality of discrete multicellular particles of foamed polystyrene, said particles having a particle size of 0.03 to 0.3 inch and a thickening agent, the resin latex being present in an amount of 2-60 parts by volume of resin solids per 100 parts by volume of polystyrene particles, and said thickening agent being present in an amount sufficient to increase the viscosity of the aqueous coating composition to a paint-like consistency, applying the aqueous composition onto said exterior surface, and permitting water to evaporate from the coating whereby there is formed a tenaciously adherent, weatherproof, lightweight, heat insulating coating on said exterior surface, said coating having a thickness of about 30 mils to one inch comprising said polystyrene particles and from 2-60 parts by volume of said latex resin per 100 parts by volume of said polystyrene particles.

2. A method according to claim 1 wherein the composition is applied a plurality of times.

3. A method according to claim 2 wherein a first application of said composition has a relatively low content of resin latex and a subsequent application thereof has a relatively high content of resin latex.

4. A method according to claim 1 wherein said exterior surface comprises an exterior surface of a roof.

5. A method according to claim 1 wherein said aqueous composition is thixotropic.

6. A method according to claim 1 wherein said thickening agent is selected from the group consisting of starch, gel, gum and hydroxyethyl cellulose.

7. A method according to claim 1 wherein said aqueous composition further comprises at least one member selected from the group consisting of pigments and fillers.

8. A method according to claim 1 wherein said aqueous composition further comprises an anti-freeze agent.

9. A method according to claim 8 wherein said anti-freeze agent comprises ethylene glycol.

10. A method according to claim 1 wherein said aqueous composition further comprises a defoaming agent.

11. A method according to claim 1 wherein said aqueous composition further comprises a plasticizer for plasticizing the latex resin.

12. A method according to claim 10 wherein said plasticizer comprises 2,2,4-trimethyl-1,3-pentanediol monoisobutyrate.

13. A method according to claim 1 wherein said resin latex is present in said aqueous composition in an amount of over 20 parts by volume of resin solids per 100 parts by volume of foamed polystyrene particles.

* * * * *